United States Patent
Hsu et al.

(10) Patent No.: US 10,990,003 B2
(45) Date of Patent: Apr. 27, 2021

(54) BINARIZATION METHOD AND FREEFORM MASK OPTIMIZATION FLOW

(71) Applicant: ASML NETHERLANDS B.V., Veldhoven (NL)

(72) Inventors: Duan-Fu Stephen Hsu, Fremont, CA (US); Jingjing Liu, San Jose, CA (US); Rafael C. Howell, Santa Clara, CA (US); Xingyue Peng, San Jose, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/967,789

(22) PCT Filed: Feb. 15, 2019

(86) PCT No.: PCT/EP2019/053785
§ 371 (c)(1),
(2) Date: Aug. 6, 2020

(87) PCT Pub. No.: WO2019/158682
PCT Pub. Date: Aug. 22, 2019

(65) Prior Publication Data
US 2020/0363713 A1     Nov. 19, 2020

Related U.S. Application Data

(60) Provisional application No. 62/631,940, filed on Feb. 18, 2018.

(51) Int. Cl.
*G03F 1/70*     (2012.01)
*G06F 30/398*     (2020.01)
*G03F 1/36*     (2012.01)

(52) U.S. Cl.
CPC .............. *G03F 1/70* (2013.01); *G03F 1/36* (2013.01); *G06F 30/398* (2020.01)

(58) Field of Classification Search
USPC ............................................................ 716/52
See application file for complete search history.

(56) References Cited

U.S. PATENT DOCUMENTS

| | | | |
|---|---|---|---|
| 5,229,872 | A | 7/1993 | Mumola |
| 6,046,792 | A | 4/2000 | Van Der Werf et al. |

(Continued)

FOREIGN PATENT DOCUMENTS

| | | |
|---|---|---|
| TW | 201804265 | 2/2018 |
| TW | 201804365 | 2/2018 |

(Continued)

OTHER PUBLICATIONS

International Search Report and Written Opinion issued in corresponding PCT Patent Application No. PCT/EP2019/053785, dated Apr. 26, 2019.

(Continued)

*Primary Examiner* — Mohammed Alam
(74) *Attorney, Agent, or Firm* — Pillsbury Winthrop Shaw Pittman LLP

(57) ABSTRACT

A method to determine a mask pattern for a patterning device. The method includes obtaining a target pattern to be printed on a substrate, an initial continuous tone image corresponding to the target pattern, a binarization function (e.g., a sigmoid, an arctan, a step function, etc.) configured to transform the initial continuous tone image, and a process model configured to predict a pattern on the substrate from an output of the binarization function; and generating a binarized image having a mask pattern corresponding to the initial continuous tone image by iteratively updating the initial continuous tone image based on a cost function such (Continued)

that the cost function is reduced. The cost function (e.g., EPE) determines a difference between a predicted pattern determined by the process model and the target pattern.

20 Claims, 10 Drawing Sheets

(56) References Cited

U.S. PATENT DOCUMENTS

| | | |
|---|---|---|
| 7,124,394 B1 | 10/2006 | Abrams et al. |
| 7,441,227 B2 | 10/2008 | Abrams et al. |
| 7,703,069 B1 | 4/2010 | Liu et al. |
| 7,716,627 B1 | 5/2010 | Ungar et al. |
| 8,490,034 B1 | 7/2013 | Torunoglu et al. |
| 8,584,056 B2 | 11/2013 | Chen et al. |
| 9,111,062 B2 | 8/2015 | Chen et al. |
| 2004/0205684 A1 | 10/2004 | Gothoskar et al. |
| 2007/0031745 A1 | 2/2007 | Ye et al. |
| 2007/0050749 A1 | 3/2007 | Ye et al. |
| 2008/0301620 A1 | 12/2008 | Ye et al. |
| 2008/0309897 A1 | 12/2008 | Wong et al. |
| 2009/0157630 A1 | 6/2009 | Yuan |
| 2010/0162197 A1 | 6/2010 | Ye et al. |
| 2010/0180251 A1 | 7/2010 | Ye et al. |
| 2011/0035709 A1 | 2/2011 | Liu et al. |
| 2011/0230999 A1 | 9/2011 | Chen et al. |
| 2012/0278770 A1 | 11/2012 | Fujimura et al. |
| 2013/0074017 A1 | 3/2013 | Iwase et al. |
| 2014/0040838 A1 | 2/2014 | Liu et al. |
| 2014/0189614 A1 | 7/2014 | Liu et al. |
| 2014/0245240 A1 | 8/2014 | Tiphine et al. |
| 2016/0252807 A1 | 9/2016 | Manakli et al. |
| 2017/0184979 A1 | 6/2017 | Hsu et al. |
| 2018/0149967 A1 | 5/2018 | Lai et al. |

FOREIGN PATENT DOCUMENTS

| | | |
|---|---|---|
| WO | 2017202665 | 11/2017 |
| WO | 2019048506 | 3/2019 |

OTHER PUBLICATIONS

Spence, C.: "Full-Chip Lithography Simulation and Design Analysis—How OPC Is Changing IC Design", Proc. of SPIE, vol. 5751, pp. 1-14 (2005).

Poonawala, Amyn et al.: "Mask Design for Optical Microlithography—An Inverse Imaging Problem", IEEE Transactions on Image Processing, vol. 16, No. 3, pp. 774-788 (2007).

Saleh, B.E.A. et al.: "Reduction of errors of microphotographic reproductions by optimal corrections of original masks", Optical Engineering, vol. 20, No. 5 (Sep. /Oct. 1981).

Osher, S. et al.: "Fronts Propagating with Curvature Dependent Speed: Algorithms Based on Hamilton-Jacobi Formulations", Journal of Computational Physics, vol. 79, pp. 12-49 (1988).

Malladi, R. et al.: "Topology-independent shape modeling scheme", Proc. of SPIE, vol. 2031, pp. 246-258 (1993).

Pang, L. et al.: "Inverse Lithography Technology (ILT) Keep the balance between SRAF and MRC at 45 and 32-nm", Proc. of SPIE., vol. 6730 (2007).

BINARIZATION METHOD AND FREEFORM MASK OPTIMIZATION FLOW

CROSS-REFERENCE TO RELATED APPLICATIONS

This application is the U.S. national phase entry of PCT patent application no. PCT/EP2019/053785, which was filed on Feb. 15, 2019, which claims the benefit of priority of U.S. patent application no. 62/631,940 which was filed on Feb. 18, 2018, and which is incorporated herein in its entirety by reference.

TECHNICAL FIELD

The description herein relates generally to mask manufacturing and patterning process. More particularly, an apparatus or a method for a determining patterning device patterns for a design layout.

BACKGROUND

A lithographic projection apparatus can be used, for example, in the manufacture of integrated circuits (ICs). In such a case, a patterning device (e.g., a mask) may contain or provide a pattern corresponding to an individual layer of the IC ("design layout"), and this pattern can be transferred onto a target portion (e.g. comprising one or more dies) on a substrate (e.g., silicon wafer) that has been coated with a layer of radiation-sensitive material ("resist"), by methods such as irradiating the target portion through the pattern on the patterning device. In general, a single substrate contains a plurality of adjacent target portions to which the pattern is transferred successively by the lithographic projection apparatus, one target portion at a time. In one type of lithographic projection apparatuses, the pattern on the entire patterning device is transferred onto one target portion in one go; such an apparatus is commonly referred to as a stepper. In an alternative apparatus, commonly referred to as a step-and-scan apparatus, a projection beam scans over the patterning device in a given reference direction (the "scanning" direction) while synchronously moving the substrate parallel or anti-parallel to this reference direction. Different portions of the pattern on the patterning device are transferred to one target portion progressively. Since, in general, the lithographic projection apparatus will have a reduction ratio M (e.g., 4), the speed F at which the substrate is moved will be 1/M times that at which the projection beam scans the patterning device. More information with regard to lithographic devices as described herein can be gleaned, for example, from U.S. Pat. No. 6,046,792, incorporated herein by reference.

Prior to transferring the pattern from the patterning device to the substrate, the substrate may undergo various procedures, such as priming, resist coating and a soft bake. After exposure, the substrate may be subjected to other procedures ("post-exposure procedures"), such as a post-exposure bake (PEB), development, a hard bake and measurement/inspection of the transferred pattern. This array of procedures is used as a basis to make an individual layer of a device, e.g., an IC. The substrate may then undergo various processes such as etching, ion-implantation (doping), metallization, oxidation, chemo-mechanical polishing, etc., all intended to finish off the individual layer of the device. If several layers are required in the device, then the whole procedure, or a variant thereof, is repeated for each layer. Eventually, a device will be present in each target portion on the substrate. These devices are then separated from one another by a technique such as dicing or sawing, whence the individual devices can be mounted on a carrier, connected to pins, etc.

Thus, manufacturing devices, such as semiconductor devices, typically involves processing a substrate (e.g., a semiconductor wafer) using a number of fabrication processes to form various features and multiple layers of the devices. Such layers and features are typically manufactured and processed using, e.g., deposition, lithography, etch, chemical-mechanical polishing, and ion implantation. Multiple devices may be fabricated on a plurality of dies on a substrate and then separated into individual devices. This device manufacturing process may be considered a patterning process. A patterning process involves a patterning step, such as optical and/or nanoimprint lithography using a patterning device in a lithographic apparatus, to transfer a pattern on the patterning device to a substrate and typically, but optionally, involves one or more related pattern processing steps, such as resist development by a development apparatus, baking of the substrate using a bake tool, etching using the pattern using an etch apparatus, etc.

As noted, lithography is a central step in the manufacturing of device such as ICs, where patterns formed on substrates define functional elements of the devices, such as microprocessors, memory chips, etc. Similar lithographic techniques are also used in the formation of flat panel displays, micro-electro mechanical systems (MEMS) and other devices.

As semiconductor manufacturing processes continue to advance, the dimensions of functional elements have continually been reduced while the amount of functional elements, such as transistors, per device has been steadily increasing over decades, following a trend commonly referred to as "Moore's law". At the current state of technology, layers of devices are manufactured using lithographic projection apparatuses that project a design layout onto a substrate using illumination from a deep-ultraviolet illumination source, creating individual functional elements having dimensions well below 100 nm, i.e. less than half the wavelength of the radiation from the illumination source (e.g., a 193 nm illumination source).

This process in which features with dimensions smaller than the classical resolution limit of a lithographic projection apparatus are printed, is commonly known as low-$k_1$ lithography, according to the resolution formula $CD=k_1 \times \lambda/NA$, where $\lambda$ is the wavelength of radiation employed (currently in most cases 248 nm or 193 nm), NA is the numerical aperture of projection optics in the lithographic projection apparatus, CD is the "critical dimension"—generally the smallest feature size printed—and $k_1$ is an empirical resolution factor. In general, the smaller $k_1$ the more difficult it becomes to reproduce a pattern on the substrate that resembles the shape and dimensions planned by a designer in order to achieve particular electrical functionality and performance. To overcome these difficulties, sophisticated fine-tuning steps are applied to the lithographic projection apparatus, the design layout, or the patterning device. These include, for example, but not limited to, optimization of NA and optical coherence settings, customized illumination schemes, use of phase shifting patterning devices, optical proximity correction (OPC, sometimes also referred to as "optical and process correction") in the design layout, or other methods generally defined as "resolution enhancement techniques" (RET). The term "projection optics" as used herein should be broadly interpreted as encompassing various types of optical systems, including refractive optics, reflective optics, apertures and catadioptric optics, for example. The term "projection optics" may also include components operating according to any of these design types for directing, shaping or controlling the projection beam of radiation, collectively or singularly. The term "projection optics" may include any optical component in the lithographic projection apparatus, no matter where the optical component is located on an optical path of the lithographic projection apparatus. Projection optics may include optical components for shaping, adjusting and/or projecting radiation from the source before the radiation passes the patterning device, and/or optical components for shaping, adjusting and/or projecting the radiation after the radiation passes the patterning device. The projection optics generally exclude the source and the patterning device.

SUMMARY

According to an embodiment of the present disclosure, there is provided a method to determine a mask pattern for a patterning device. The method includes obtaining (i) a target pattern to be printed on a substrate subjected to a patterning process, (ii) an initial continuous tone image of the patterning device corresponding to the target pattern, (iii) a binarization function configured to transform the initial continuous tone image, and (iv) a process model configured to predict a pattern on the substrate from an output of the binarization function, and generating, by a hardware computer system, a binarized image having a mask pattern corresponding to the initial continuous tone image by iteratively updating the initial continuous tone image based on a cost function such that the cost function is reduced, where the cost function determines a difference between a predicted pattern determined by the process model and the target pattern.

According to an embodiment, the binarization function is a sigmoid function, an arctan function, and/or a step function.

According to an embodiment, the mask pattern is a curvilinear pattern and/or a Manhattan pattern.

According to an embodiment, each iteration of determining the curvilinear pattern includes generating a transformed image by applying a binarization function to the initial continuous tone image, predicting, via simulation of the process model, a pattern from the transformed image, determining whether the cost function is reduced, in response to the cost function not reduced, determining a gradient of the cost function, and modifying values of mask variables corresponding to the initial continuous tone image and/or parameters of the binarization function based on the gradient of the cost function such that the cost function is reduced.

According to an embodiment, the determining the gradient of the cost function involves computing a complete gradient over mask variables for the binarization function including at least one of the sigmoid function, the arctan function, and the step function.

According to an embodiment, modifying values of the mask variables and/or the parameters of the binarization function includes applying an optimization process to the gradient of the cost function, identifying values of the mask variables and/or the parameters that result in a minimum gradient value, and assigning the identified values to the mask variables.

According to an embodiment, the mask variables are intensity values of pixels within the initial continuous tone image.

According to an embodiment, the parameters of the binarization function comprise a steepness and threshold.

According to an embodiment, the cost function is minimized.

According to an embodiment, the cost function is an edge placement error and/or a mask rule check violation probability.

According to an embodiment, the initial continuous tone image is a continuous transmission mask image comprising features corresponding to the target pattern and sub-resolution assist features.

According to an embodiment, the method further includes manufacturing a patterning device including structural features corresponding to the binarized image.

According to an embodiment, the method further includes performing, by a lithographic apparatus, a patterning step using a patterning device having the binarized pattern to print a corresponding pattern on the substrate.

According to an embodiment, the structural features correspond to optical proximity corrections including assist features and/or contour modification.

Furthermore, according to an embodiment of the present disclosure, there is provided a computer program product comprising a non-transitory computer readable medium having instructions recorded thereon, the instructions when executed by a computer implementing the above method.

DETAILED DESCRIPTION

Figure 1:
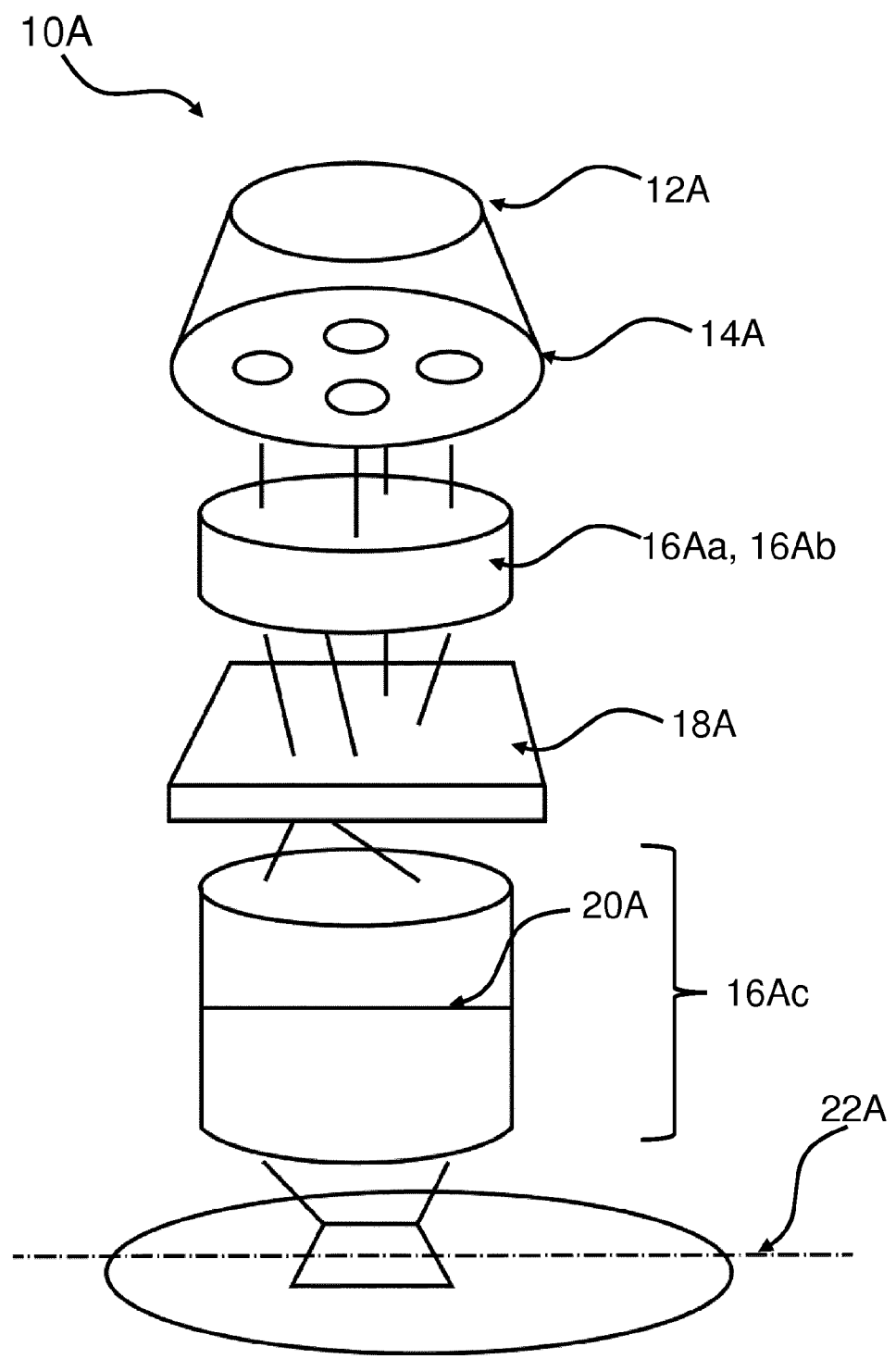
FIG. 1 shows a block diagram of various subsystems of a lithography system.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range of about 5-100 nm).

The patterning device can comprise, or can form, one or more design layouts. The design layout can be generated utilizing CAD (computer-aided design) programs, this process often being referred to as EDA (electronic design automation). Most CAD programs follow a set of predetermined design rules in order to create functional design layouts/patterning devices. These rules are set by processing and design limitations. For example, design rules define the space tolerance between devices (such as gates, capacitors, etc.) or interconnect lines, so as to ensure that the devices or lines do not interact with one another in an undesirable way. One or more of the design rule limitations may be referred to as "critical dimension" (CD). A critical dimension of a device can be defined as the smallest width of a line or hole or the smallest space between two lines or two holes. Thus, the CD determines the overall size and density of the designed device. Of course, one of the goals in device fabrication is to faithfully reproduce the original design intent on the substrate (via the patterning device).

The term "mask" or "patterning device" as employed in this text may be broadly interpreted as referring to a generic patterning device that can be used to endow an incoming radiation beam with a patterned cross-section, corresponding to a pattern that is to be created in a target portion of the substrate; the term "light valve" can also be used in this context. Besides the classic mask (transmissive or reflective; binary, phase-shifting, hybrid, etc.), examples of other such patterning devices include:

a programmable mirror array. An example of such a device is a matrix-addressable surface having a viscoelastic control layer and a reflective surface. The basic principle behind such an apparatus is that (for example) addressed areas of the reflective surface reflect incident radiation as diffracted radiation, whereas unaddressed areas reflect incident radiation as undiffracted radiation. Using an appropriate filter, the said undiffracted radiation can be filtered out of the reflected beam, leaving only the diffracted radiation behind; in this manner, the beam becomes patterned according to the addressing pattern of the matrix-addressable surface. The required matrix addressing can be performed using suitable electronic means.

a programmable LCD array. An example of such a construction is given in U.S. Pat. No. 5,229,872, which is incorporated herein by reference.

As a brief introduction, FIG. 1 illustrates an exemplary lithographic projection apparatus 10A. Major components are a radiation source 12A, which may be a deep-ultraviolet excimer laser source or other type of source including an extreme ultra violet (EUV) source (as discussed above, the lithographic projection apparatus itself need not have the radiation source), illumination optics which, e.g., define the partial coherence (denoted as sigma) and which may include optics 14A, 16Aa and 16Ab that shape radiation from the source 12A; a patterning device 18A; and transmission optics 16Ac that project an image of the patterning device pattern onto a substrate plane 22A. An adjustable filter or aperture 20A at the pupil plane of the projection optics may restrict the range of beam angles that impinge on the substrate plane 22A, where the largest possible angle defines the numerical aperture of the projection optics NA=n sin($\Theta_{max}$), wherein n is the refractive index of the media between the substrate and the last element of the projection optics, and $\Theta_{max}$ is the largest angle of the beam exiting from the projection optics that can still impinge on the substrate plane 22A.

In a lithographic projection apparatus, a source provides illumination (i.e. radiation) to a patterning device and projection optics direct and shape the illumination, via the patterning device, onto a substrate. The projection optics may include at least some of the components 14A, 16Aa, 16Ab and 16Ac. An aerial image (AI) is the radiation intensity distribution at substrate level. A resist model can be used to calculate the resist image from the aerial image, an example of which can be found in U.S. Patent Application Publication No. US 2009-0157630, the disclosure of which is hereby incorporated by reference in its entirety. The resist model is related only to properties of the resist layer (e.g., effects of chemical processes which occur during exposure, post-exposure bake (PEB) and development). Optical properties of the lithographic projection apparatus (e.g., properties of the illumination, the patterning device and the projection optics) dictate the aerial image and can be defined in an optical model. Since the patterning device used in the lithographic projection apparatus can be changed, it is desirable to separate the optical properties of the patterning device from the optical properties of the rest of the lithographic projection apparatus including at least the source and the projection optics. Details of techniques and models used to transform a design layout into various lithographic images (e.g., an aerial image, a resist image, etc.), apply optical proximity corrections (OPC) using those techniques and models and evaluate performance (e.g., in terms of process window) are described in U.S. Patent Application Publication Nos. US 2008-0301620, 2007-0050749, 2007-0031745, 2008-0309897, 2010-0162197, and 2010-0180251, the disclosure of each which is hereby incorporated by reference in its entirety.

In an embodiment, the OPC technique involves using completely independent and non-resolvable assist features, instead of or in addition to those assist features (e.g., serifs) connected to the main features. The term "independent" here means that edges of these assist features are not connected to edges of the main features. These independent assist features are not intended or desired to print as features on the substrate, but rather are intended to modify the aerial image of a nearby main feature to enhance the printability and process tolerance of that main feature. These assist features (often referred to as "scattering bars" or "SBAR") can include sub-resolution assist features (SRAF) which are features outside edges of the main features and sub-resolution inverse features (SRIF) which are features scooped out from inside the edges of the main features. The presence of a SBAR adds yet another layer of complexity to a patterning device pattern. A simple example of a use of scattering bars is where a regular array of non-resolvable scattering bars is drawn on both sides of an isolated line feature, which has the effect of making the isolated line appear, from an aerial image standpoint, to be more representative of a single line within an array of dense lines, resulting in a process window much closer in focus and exposure tolerance to that of a dense pattern. The common process window between such a decorated isolated feature and a dense pattern will have a larger common tolerance to focus and exposure variations than that of a feature drawn as isolated at the patterning device level.

An assist feature may be viewed as a difference between features on a patterning device and features in the design layout. The terms "main feature" and "assist feature" do not imply that a particular feature on a patterning device must be labeled as one or the other.

In order to increase the chance that the projected image of the design layout is in accordance with requirements of a given target circuit design, proximity effects may be predicted and compensated for, using sophisticated numerical models, corrections or pre-distortions of the design layout. The article "Full-Chip Lithography Simulation and Design Analysis—How OPC Is Changing IC Design", C. Spence, Proc. SPIE, Vol. 5751, pp 1-14 (2005) provides an overview of current "model-based" optical proximity correction processes. In a typical high-end design almost every feature of the design layout has some modification in order to achieve high fidelity of the projected image to the target design. These modifications may include shifting or biasing of edge positions or line widths as well as application of "assist" features that are intended to assist projection of other features.

One aspect of understanding a lithographic process is understanding the interaction of the radiation and the patterning device. The electromagnetic field of the radiation after the radiation passes the patterning device may be determined from the electromagnetic field of the radiation before the radiation reaches the patterning device and a function that characterizes the interaction. This function may be referred to as the mask transmission function (which can be used to describe the interaction by a transmissive patterning device and/or a reflective patterning device).

The mask transmission function may have a variety of different forms. One form is binary. A binary mask transmission function has either of two values (e.g., zero and a positive constant) at any given location on the patterning device. A mask transmission function in the binary form may be referred to as a binary mask. Another form is continuous. Namely, the modulus of the transmittance (or reflectance) of the patterning device is a continuous function of the location on the patterning device. The phase of the transmittance (or reflectance) may also be a continuous function of the location on the patterning device. A mask transmission function in the continuous form may be referred to as a continuous tone mask or a continuous transmission mask (CTM). For example, the CTM may be represented as a pixelated image, where each pixel may be assigned a value between 0 and 1 (e.g., 0.1, 0.2, 0.3, etc.) instead of binary value of either 0 or 1. In an embodiment, CTM may be a pixelated gray scale image, where each pixel having values (e.g., within a range [−255, 255], normalized values within a range [0, 1] or [−1, 1] or other appropriate ranges). An example CTM flow and its details may be found in commonly assigned U.S. Pat. No. 8,584,056, the disclosure of which is hereby incorporated by reference in its entirety.

According to an embodiment, the design layout may be optimized as a continuous transmission mask ("CTM optimization"). In this optimization, the transmission at all the locations of the design layout is not restricted to a number of discrete values. Instead, the transmission may assume any value within an upper bound and a lower bound. More details may be found in commonly assigned U.S. Pat. No. 8,584,056, the disclosure of which is hereby incorporated by reference in its entirety. A continuous transmission mask is very difficult, if not impossible, to implement on the patterning device. However, it is a useful tool because not restricting the transmission to a number of discrete values makes the optimization much faster. In an EUV lithographic projection apparatus, the patterning device may be reflective. The principle of CTM optimization is also applicable to a design layout to be produced on a reflective patterning device, where the reflectivity at all the locations of the design layout is not restricted to a number of discrete values. Therefore, as used herein, the term "continuous transmission mask" may refer to a design layout to be produced on a reflective patterning device or a transmissive patterning device. The CTM optimization may be based on a three-dimensional mask model that takes in account thick-mask effects. The thick-mask effects arise from the vector nature of light and may be significant when feature sizes on the design layout are smaller than the wavelength of light used in the lithographic process. The thick-mask effects include polarization dependence due to the different boundary conditions for the electric and magnetic fields, transmission, reflectance and phase error in small openings, edge diffraction (or scattering) effects or electromagnetic coupling. More details of a three-dimensional mask model may be found in commonly assigned U.S. Pat. No. 7,703,069, the disclosure of which is hereby incorporated by reference in its entirety.

In an embodiment, assist features (sub resolution assist features and/or printable resolution assist features) may be placed into the design layout based on the design layout optimized as a continuous transmission mask. This allows identification and design of the assist feature from the continuous transmission mask.

In an embodiment, a thin-mask approximation, also called the Kirchhoff boundary condition, may be used to simplify the determination of the interaction of the radiation and the patterning device. The thin-mask approximation assumes that the thickness of the structures on the patterning device is very small compared with the wavelength and that the widths of the structures on the mask are very large compared with the wavelength. Therefore, the thin-mask approximation assumes the electromagnetic field after the patterning device is the multiplication of the incident electromagnetic field with the mask transmission function. However, as lithographic processes use radiation of shorter and shorter wavelengths, and the structures on the patterning device become smaller and smaller, the assumption of the thin-mask approximation can break down. For example, interaction of the radiation with the structures (e.g., edges between the top surface and a sidewall) because of their finite thicknesses ("mask 3D effect" or "M3D") may become significant. Encompassing this scattering in the mask transmission function may enable the mask transmission function to better capture the interaction of the radiation with the patterning device. A mask transmission function under the thin-mask approximation may be referred to as a thin-mask transmission function. A mask transmission function encompassing M3D may be referred to as a M3D mask transmission function.

In an embodiment, an optical mask pattern may be determined by an inverse lithography technology or process (ILT). Driven by the needs of smaller technology nodes (smaller feature sizes on a substrate) and advent of multi-beam mask writers, JILT has become a practical approach to find an optimal mask pattern. A continuous transmission mask (CTM) is an ILT-based computational technique (e.g., implemented in Tachyon SMO) that may generate an environment-adaptive (e.g., related to lithographic process) OPC (e.g., SRAFs). However, traditional approaches such as model based OPC have run into severe limitations at advanced technology nodes (14 nm and lower), because they are involved with heuristic modifications of the mask which tend to lose the lithography information related to the mask patterning. ILT uses a rigorous mathematical approach to search the entire solution space to solve for the optimal mask. Thus, the ILT algorithm generally requires the cost function to be defined in a closed form which includes a continuous varying solution space and optimized with a rigorous simulation of process models. An image-based mask variable may be optimized freely in intensity (or magnitude) within the bounded spatial coordinate (also known as ambit), however a free form modification of images needs a process to convert a continuous tone mask (CTM) into a binary mask. Conventionally, SMO approaches use a ridge-based extraction to place SRAF seeding which loses printability in a mask optimization process. Furthermore, SRAF filtering and heuristic clean up causes SRAF fragmentation issues which may violate mask rule checks (MRC). As such, an approach to binarize the CTM and guide the mask optimization towards an optimum solution is required. An example method of binarization of a CTM is discussed below.

Figure 2:
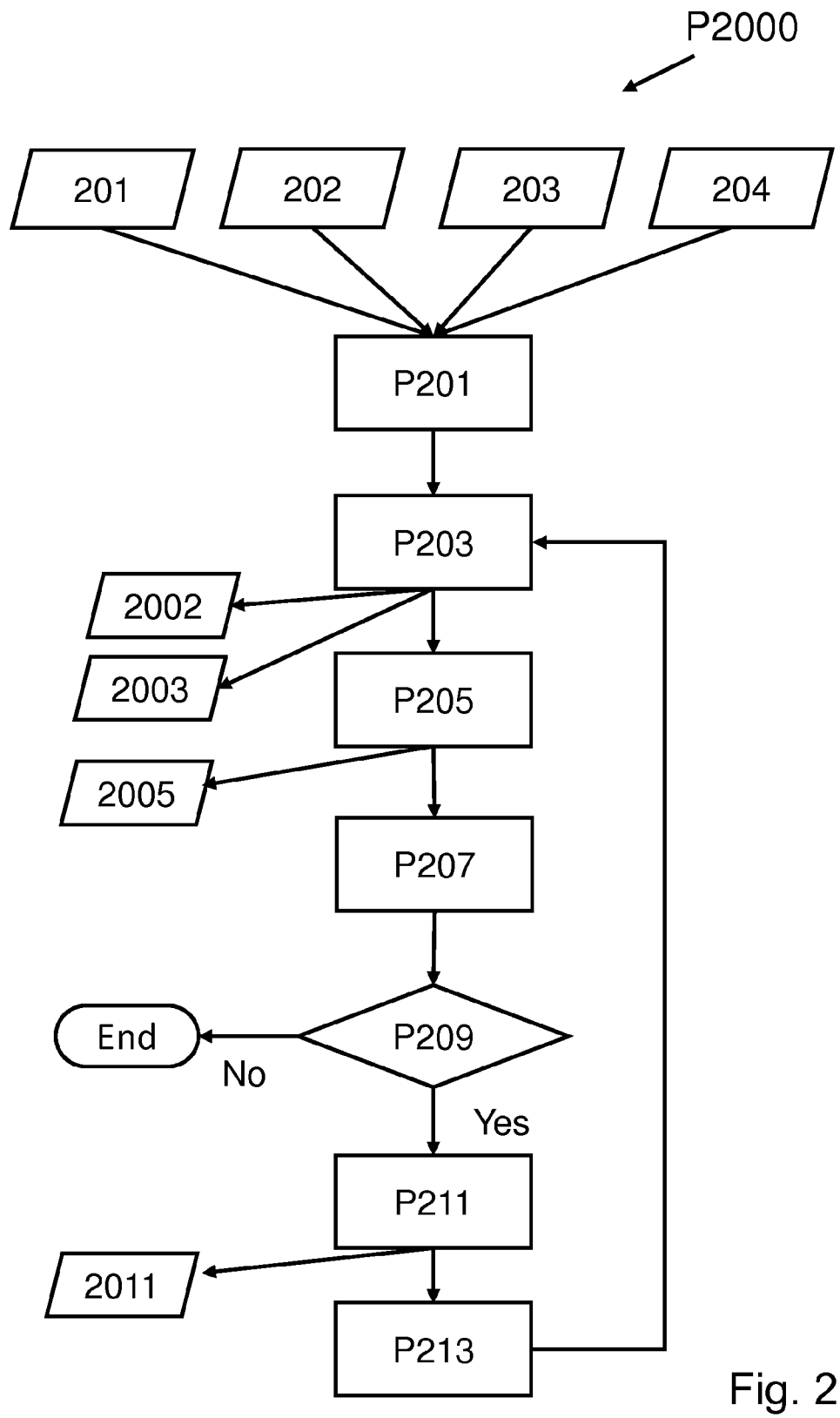
FIG. 2 is flow chart of a method of binarization of a continuous transmission mask, according to an embodiment.

FIG. 2 is flow chart of a method P2000 for determining a patterning device pattern (or mask pattern, hereinafter) from an image (e.g., continuous transmission mask image, a binary mask image, a curvilinear mask image, etc.). A curvilinear mask image refers to an image of a mask (or a mask pattern) having curvilinear or polygon shaped patterns including the main or target feature and/or assist features (e.g., SRAF). The mask pattern corresponds to a design layout or a target pattern to be printed on a substrate via a patterning process involving a lithographic process. In an embodiment, the design layout or the target pattern may be a binary design layout, a continuous tone design layout, or a design layout of another suitable form. In an embodiment, the target pattern may be represented as pixelated images.

The method is an iterative process, where an initial continuous tone image (e.g., CTM image) is progressively modified to generate different types of images according to different processes of the present disclosure to eventually generate a mask image (e.g., a curvilinear mask image) that may be used to fabricate/manufacture a mask. The iterative modification of the initial continuous tone image (or generally referred as an initial image) may be based on a cost function, where during each iteration the initial image may be modified such that the cost function is reduced (in an embodiment, minimized). In an embodiment, the method utilizes a litho-aware cost function (e.g., an edge placement error (EPE)) to trace the contours of a simulated pattern on a substrate and gradually binarize the CTM image. Typically, a process of converting the CTM to binary image may involve a level-set method to determine contours (or boundary) of a mask pattern and a step function, which may not account for a lithographic process that results in an inaccurate mask pattern.

In an embodiment, process P201 may involve obtaining (i) a target pattern 201 to be printed on a substrate subjected to a patterning process, (ii) an initial image 202 of the patterning device corresponding to the target pattern, (iii) a binarization function 203 configured to transform the initial image, and (iv) a process model 204 configured to predict a pattern on the substrate from an output of the binarization function. In an embodiment, the method may be modified to generate one or more of the aforementioned elements e.g., the target pattern 201 and/or the initial image 202.

In an embodiment, the target pattern 201 may be a binary pattern, a continuous tone mask pattern, or a target layout of a suitable form. The target pattern is a pattern that is expected to be printed on a substrate subjected to the patterning process. Corresponding to the target image 201, the initial image 202 may be obtained. The initial image 202 may be a continuous transmission mask image comprising OPC related features (e.g., SRAFs) corresponding to the target pattern 201.

In an embodiment, the initial image 202 may be a CTM image generated by a mask optimization algorithm (e.g., including OPC generation process, mentioned earlier) based on a target pattern to be printed on a substrate. The CTM image may then be received by the process P201. In an embodiment, the process P201 may be configured to generate a CTM image. For example, in an example mask optimization technique, an inverse lithography problem is formulated as an optimization problem. The variables may be related to values of pixels in a mask image, and lithography metrics such as EPE or sidelobe printings may be used as a cost function. In each iteration of the optimization, a mask image may be constructed from the variables and then a process model (e.g., Tachyon model) may be applied to obtain optical or resist images and compute a cost function. The cost function computation involves a gradient computation that generates gradient values which are used in the optimization solver to update variables (e.g., pixel intensities). After several iterations during optimization, a final mask image may be generated, which is further used as a guidance map for pattern extraction (e.g., as implemented in Tachyon iOPC and SMO software). Such initial image (e.g., the CTM image) may include one or more features (e.g., a feature of a target pattern, SRAFs, serifs, etc.) corresponding to the target pattern to be printed on the substrate via the patterning process.

In an embodiment, the binarization function 203 may be configured to gradually transform the initial image to a binary image. In an embodiment, the binarization function may be a logistic function of the form of:

$$f(\emptyset) = \frac{L}{1 + e^{-k(\emptyset - \emptyset_0)}} \quad (1)$$

In the above equation, L is a curve's maximum value, k is a steepness of the curve and $\emptyset_0$ is a value of variable $\emptyset$ at the curve's midpoint. In an embodiment, variable $\emptyset$ may be a level-set function or pixel locations in an image. In an embodiment, the logistic function may be a sigmoid function (i.e., where k=1, $\emptyset_0$=0, and L=1), an arctan (i.e., inverse tangent) function, and/or a step function in a form, as follows (equation 2):

$$f(\emptyset) = \begin{cases} \text{high, for } \emptyset > \emptyset_0 \\ \text{low, for } \emptyset < \emptyset_0 \end{cases} \quad (2)$$

In another embodiment, the binarization function may be a set of functions based on an underlying logistic function as follows:

$$f(\emptyset) = d_{low} \frac{d_{high} - d_{low}}{1 + e^{-k(\emptyset - \emptyset_0)}} \quad (3)$$

$$d_{low} = \text{low} - \frac{\text{high} - \text{low}}{b - a}(1 + a) \quad (4)$$

$$d_{high} = \text{low} + \frac{\text{high} - \text{low}}{b - a}(1 + a) \quad (5)$$

$$a = e^{-k(\text{high} - \text{threshold})} \quad (6)$$

-continued $$b = e^{-k(low-threshold)} \quad (7)$$

Figure 3:
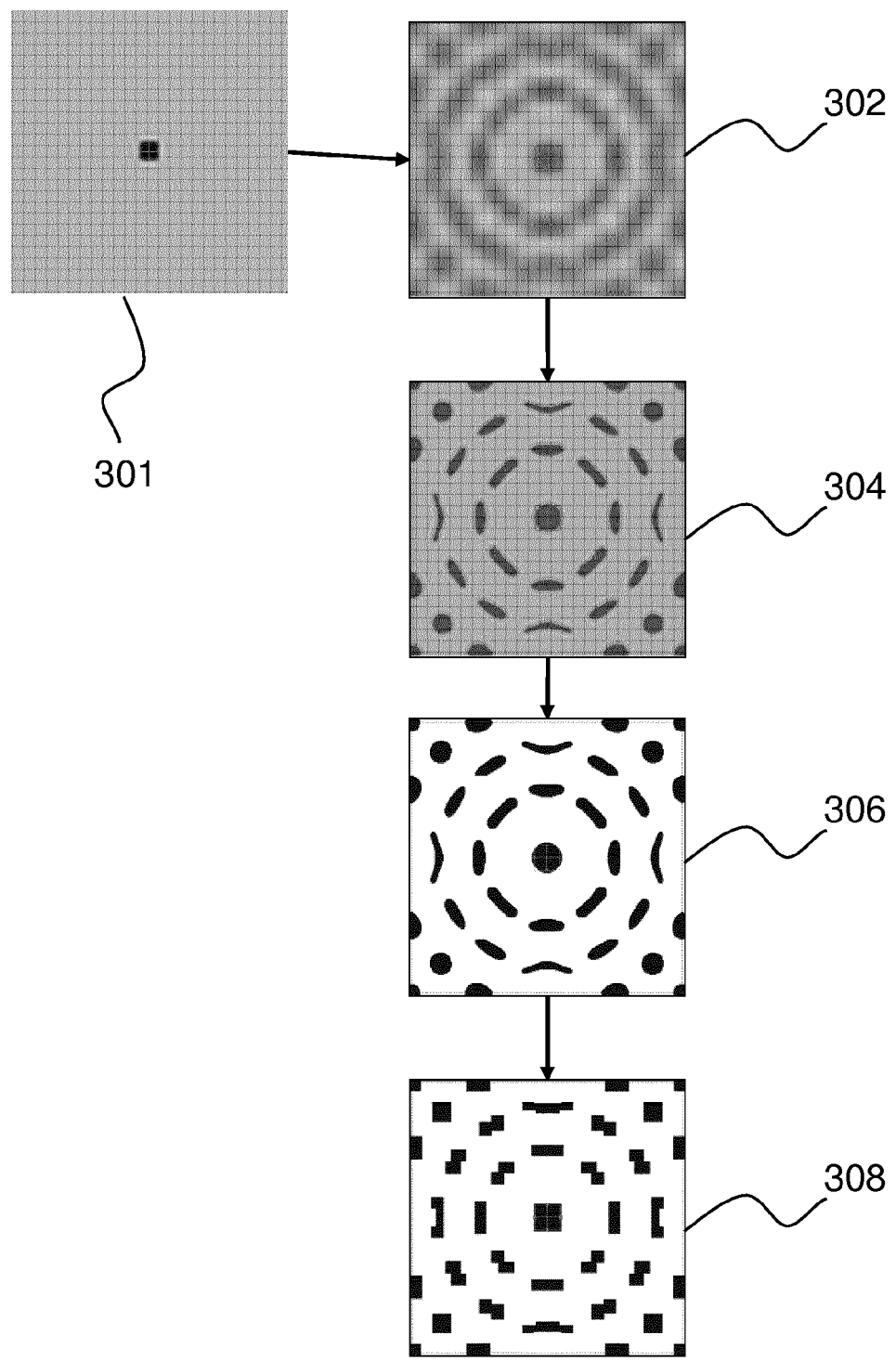
FIG. 3 illustrates an example of a binarized mask image generated by the method of FIG. 2, according to an embodiment.
Figure 4:
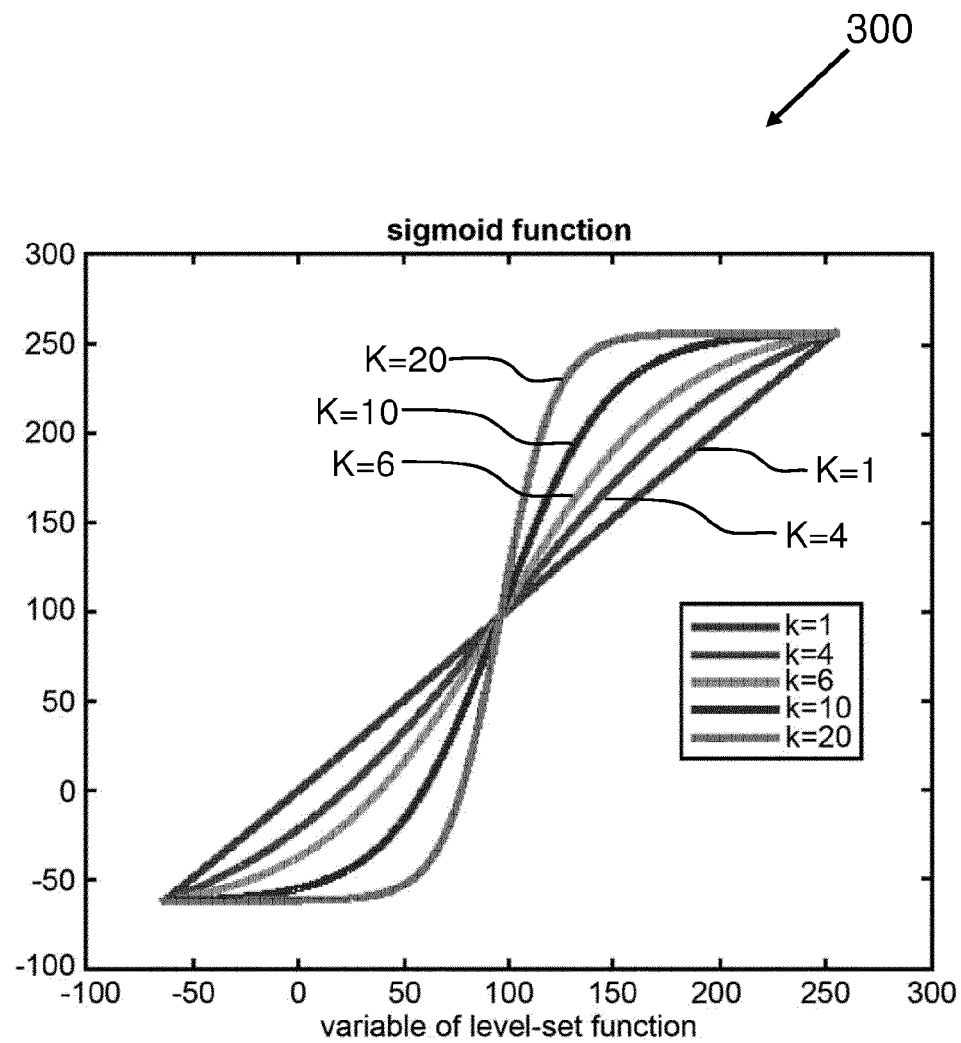
FIG. 4 illustrates an example binarization function using the method of FIG. 2, according to an embodiment.

In the above set of equations (3)-(7), the variable Ø may be a level-set function or pixel locations in an image, $f(\emptyset)$ represents a mask image, low is a lowest value of the function $f$, high is the highest value of the function $f$, k is a steepness of the curve and threshold may be a selected value or a function so that there is no fixed cutoff rather a gradual cutoff or soft edge. In an embodiment, the k and threshold may be set/modified for gradual binarization purposes during the optimization process. In an embodiment, k and threshold may be the tuning parameters that may be updated during the optimization process according to the present method. An example tuning of the functions of equation (3)-(7) is illustrated in FIG. 3, where the parameter k (i.e., steepness of the curve) is gradually varied (e.g., increased from k=1 to k=20) based on the cost function. Accordingly, the binary function gradually transforms an initial CTM image into a binarized image, further discussed in processes below. The resulting binary image may be further used to manufacture a curvilinear mask.

In an embodiment, the process model 204 may be configured to predict a pattern on the substrate from an output of the binarization function. In an embodiment, the process model may be one or more of the M3D model, optics model, resist model, etch model, etc. that may be connected to each other to receive inputs from one model (e.g., optics model receives input from a M3D model) and send output to another connected model (e.g., the optics model sends output to the resist model). In an embodiment, the process models may be a physics-based model, an empirical model, and/or a machine learning-based model, as may be known to person of ordinary skill in the art.

Further, the method may involve a process P203 of generating a binarized image having a mask pattern corresponding to the initial image by iteratively updating the initial image (e.g., 201) to produce a semi-binarized and/or binarized image (e.g., 2002) based on a cost function. In each iteration, the cost function is gradually reduced, as discussed later (e.g., in process P207, P209, P211, and P213). The semi-binarized and/or binarized or a transformed image 2002 may be generated by applying a binarization function (e.g., one or more of the equations 1-7) to the initial image. At the end of the process P203, the initial image 201 gradually involves into the intermediate image 2002 to eventually result in a final binary image 2003, for example, an image 306 in FIG. 3

In FIG. 3, an example target image 301 may include a contact hole in a center of the substrate. The target image 301 may be used to obtain/generate a CTM image 302, which may be an example of the initial image 201 that may be further transformed into a semibinarized and/or binarized image 304 by applying the binarization function. After several iterations of the optimization process based on the cost function, the initial image 302 may gradually evolve into a final binarized image 306. Furthermore, in an embodiment, a plurality of short segments of the final binarized image 306 may be replaced with a longer segment, with a stair step pattern, with a diagonal, with a horizontal or vertical segment in combination with a diagonal segment or a combination thereof. For example, patterns in the final binarized image 306 may be converted to stair-step patterns as shown in a staircase image 308. In the images 304, and 306, it may be observed that curvilinear patterns (e.g., contact hole and SRAFs around the contact hole) depicted in the CTM image 302 is preserved.

In an embodiment, to enable the binarization (e.g., using equations 1-6), a threshold value may be assigned to the result of the logistic function based transformation (e.g., as shown in equation 5 or 6). For example, in the case of a sigmoid function having maximum and minimum values "1" and "0", respectively, the threshold can be approximately 0.5 (or lower than 0.5), which indicates that after sigmoid transformation a pixel of the resulting image having a value approximately greater than 0.5 may be assigned a value 1, and if lower than 0.5 may be assigned a value 0. In an embodiment, where a step function is used, the binary "1" may be assigned to those pixel with values greater than the threshold and the binary "0" may be assigned to those pixel with values smaller than the threshold. Although the step function is discontinuous at the threshold, an exact mathematical form of the gradient of the mask image over mask variables may be developed, for example, as follows:

$$\frac{\partial MI}{\partial \varphi} = \oint w(n_x - x)w(n_y - y)w(n'_x - x)w(n'_y - y)\frac{1}{|\nabla \varphi(x, y)|}ds$$

In above equation, MI represents the mask image obtained by applying step function on mask variables $\varphi$, w is the anti-aliasing window function used to upsample/downsample the variables $\varphi$. So, the binarization function could be sigmoid/arctan, or step function or both. Furthermore, the gradient of cost function over mask variables is developed. In an embodiment, the determining of the gradient of the cost function involves computing a complete gradient over mask variables for the binarization function including at least one of (or all of) the sigmoid function, the arctan function, and the step function.

In an embodiment, the binarization can be used with an EPE based cost function and/or any other cost function (or objective function) metric such as MSE, MXE, RMS, etc. In an embodiment, the binarization can be used in conjunction with a regular MSE/MXE cost function as a fine tuning process to further improve a predicted pattern using a regular MSE/MXE cost function. For example, as discussed with respect to processes P207, P211, and P213.

After generating the semi-binarized/binarized (or transformed) image 2002, the process P205 may involve predicting, via simulation of the process model, a predicted pattern 2005 that may be formed on a substrate based on the image 2002. As discussed earlier, the process model may be one or more of the M3D model, optics model, resist model, etc. that may be connected together. In an embodiment the process model may be a physics-based model, an empirical model, and/or a machine learning-based model.

Further, the method, in process P207 may involve extracting contours from the predicted pattern 2005 and evaluating the cost function. The cost function may be an edge placement error, a defect based metric, and/or a mask rule check based metric such as MRC violation probability.

In an embodiment, the cost function may use an edge point enhancement technique according to the present disclosure. In the edge point enhancement technique, a contour is fitted to the edge of the one or more main features and/or the one or more optical proximity corrections of the predicted pattern and the target pattern. That is, the contour fits or traces edge points of the one or more main features and/or the one or more optical proximity corrections. In an embodiment, the edge point enhancement technique involves converting an image (e.g., gray-scale image) of the predicted pattern and/or the target pattern to contours (e.g., GDSII, OASIS or other format) of the one or more main features and/or the one or more optical proximity corrections using any contour identification technique. For example, a contour identification technique can involve identifying the edge and applying a threshold to identify the contour (e.g., evaluating gray-scale values along lines perpendicular to the edge and running through the edge to identify where a gray-scale value passes a certain threshold to identify that as a contour location). In an embodiment, the contour identification technique can evaluate a gradient at points along the edge to extract a contour. In an embodiment, the image can be upscaled to a finer pixel grid for the purpose of contour identification. In an embodiment, the image can have binary pixels, e.g., a binarized version obtained using a technique as described herein. In an embodiment, the one or more contours are extracted from the image data of the predicted patter and the target pattern and used in the objective function evaluation.

In an embodiment, the processing of the predicted pattern and the target pattern can involve identifying an edge of each of features corresponding to the target pattern in the image (or image data). Furthermore, in an embodiment, a higher importance (e.g., weight) may be assigned to the one or more identified edges of a predicted and/or target features within an image than another part, for example, the optical proximity correction(s) and/or to other parts of the design pattern.

Furthermore, the method, in process P209 may involve determining whether the cost function is reduced (in an embodiment, minimized).

In an embodiment, if the cost function is not minimized, the method, in process P211 may involve determining a gradient (or a gradient map 2011) of the cost function. In an embodiment, the process P211 may involve generating a gradient map 2011 based on the cost function (e.g., EPE). The gradient map 2011 may be a derivative and/or a partial derivative of the cost function. In an embodiment the partial derivative of the cost function may be determined with respect to variables of the mask image and the derivative may be further chained to determine a partial derivative with respect to the variables of the initial image 201 and/or the binarization function.

The gradient map 2011 may provide a recommendation about increasing or decreasing the values of the mask variables (i.e., values of the initial image or binarization function) in a manner such that value of the cost function is reduced, in an embodiment, minimized. In an embodiment, an optimization algorithm may be applied to the gradient map 2011 to determine the mask variable values. In an embodiment, a optimization solver conjugate gradient or quasi-Newton method may be used to perform gradient-based computation.

Further, the method, in process P213 may involve determining and modifying values of mask variables corresponding to the initial image (e.g., intensities of pixels in the initial image 201) and/or parameters of the binarization function (e.g., k and threshold in equations 1-6) based on the gradient map 2011 of the cost function such that the cost function is gradually reduced (in an embodiment, minimize) The method may then return to the process P203 and perform subsequent processes (i.e., P205, P207, P209, P211 and P213) in a loop. At the end of several iterations (e.g., when cost function is minimized), the binarized image obtained includes curvilinear patterns similar to the CTM images. Thus, in each iteration, the initial image 201 is getting transformed into the binarized image 2003 such that effects of the patterning process are considered. For example, at each iteration, effects of the patterning process (and associated variance) are accounted for via the simulation of the process model, the cost function (e.g., EPE) which is based on the output of the process model and the gradient map which is based on the cost function.

In an embodiment, a regularization process of the mask pattern (or mask image) may be performed. The regularization process simplifies complex mask patterns that may be generated from, for example, CTM images and consequently appearing in the binarized mask image generated from such CTM images. In an embodiment, if the ILT solution space is not regulated, it may produce complex mask patterns that violates MRC which severely compromises the value of the ILT solution. In order to address this issue, a method to regularize the mask image either into "Manhattan" shape or "curved" shape may be performed along with the EPE based cost function. The regularization process guides the mask image to evolve into preferred shapes to reduce the mask complexity. For example, regularization process may be incorporated in the method above, as a cost function term (e.g., MRC violation probability) and further incorporated in the gradient computation in a similar manner as an EPE-based gradient computation discussed earlier.

Figure 5:
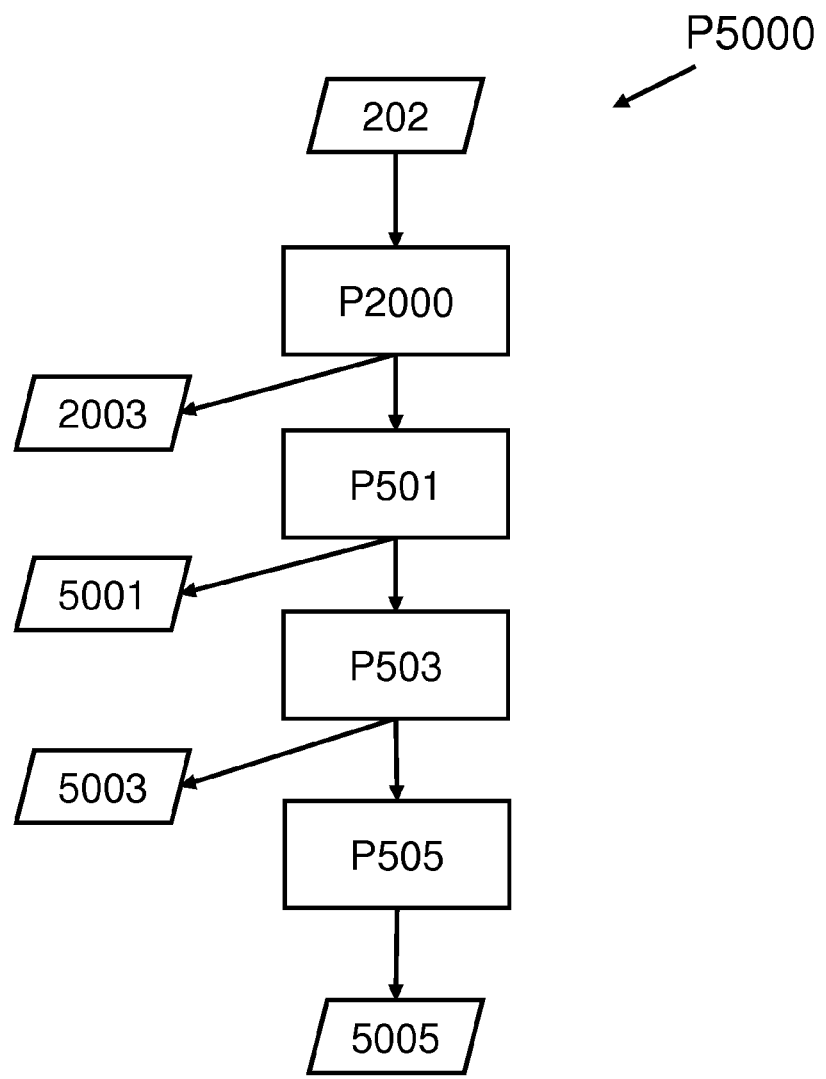
FIG. 5 is an example extension of the method of FIG. 2, according to an embodiment.

FIG. 5 is a flow chart of method P5000 further applying the process P2000 of FIG. 2 to generate a staircase mask and a mask pattern that fulfils the MRC. The method P5000 starts upon receiving or obtaining the initial image 202 (e.g., CTM image), as discussed earlier. In an embodiment, the method P2000 may be used in any other mask optimization process to further modify or update the binarized mask pattern 2003 obtained from the process P2000.

In process P2000, the initial image 202 is gradually binarized, as discussed earlier. In an embodiment, a sigmoid function may be used in the process P2000, which may generate the binarized image 2003 having pixel values between "0" or "1" or approximately close to "0" or "1" (e.g., pixel may have values greater than 0.9 and less than 0.1). Such binarized image 2003 may be further converted into a curvilinear mask image 5001 by applying a step function, in process P5001. The step function converts the pixels of the binarized image 2003 into pixels having value of either "0" or "1". In an embodiment, the step function may be directly used to convert the mask variables into binarized image having pixel values "0" or "1".

Furthermore, in process, P503, the curvilinear mask image 5001 may be converted to a staircase image 5003 having a stair step pattern, as discussed earlier. In an embodiment, to convert a curvilinear contour (or pattern) to a stair cased pattern, first, breaking points are identified on the curvilinear contour. Second, the curvilinear contour is broken into ropes (or bar shapes) using the break points and directions for rope endpoints is computed. Finally, the break points are connected with the horizontal and vertical lines to obtain the stair cased polygons.

Furthermore, in process P505, MRC violations may be determined for the image 5001 and/or 5003. A mask rule check may be defined as a set of rules or checks based on manufacturability of a mask, such mask rule checks may be evaluated to determine whether a mask pattern (e.g., a curvilinear pattern including OPC) may be manufactured. In an embodiment, MRC may be implemented in a form of an algorithm (e.g., including if-then-else condition checks). For example, the mask rule check may be based on CD values, distance between two features (e.g., target feature to SRAF or SRAF to SRAF), a radius of curvature of the feature, or other geometric parameter). In an embodiment, as discussed earlier, the process P505 may be part of the binarization process where, the cost function may include a MRC metric such as number of MRC violations, a binary variable indicating a MRC violation or no MRC violation, a MRC violation probability, or other appropriate MRC related metric.

In an embodiment, the binarized mask image 2003 having curvilinear patterns, the staircase mask image 5003 having the stair step pattern 5001, and/or the mask image 5005 (which accounts for MRC) may be manufactured or fabricated into a patterning device. Such patterning device will include structural features (e.g., target pattern, OPC, etc.) corresponding to the images 2003, 5001, and/or 5005. Further, the patterning device may be used by a pattering apparatus (e.g. a lithographic apparatus or a scanner) during a patterning step to print a corresponding pattern (e.g., the target pattern) on the substrate.

The method according to the present disclosure may be included in different aspects of mask optimization process including source mask optimization, mask optimization, and/or OPC and appropriate curvilinear mask pattern may be determined.

Figure 6:
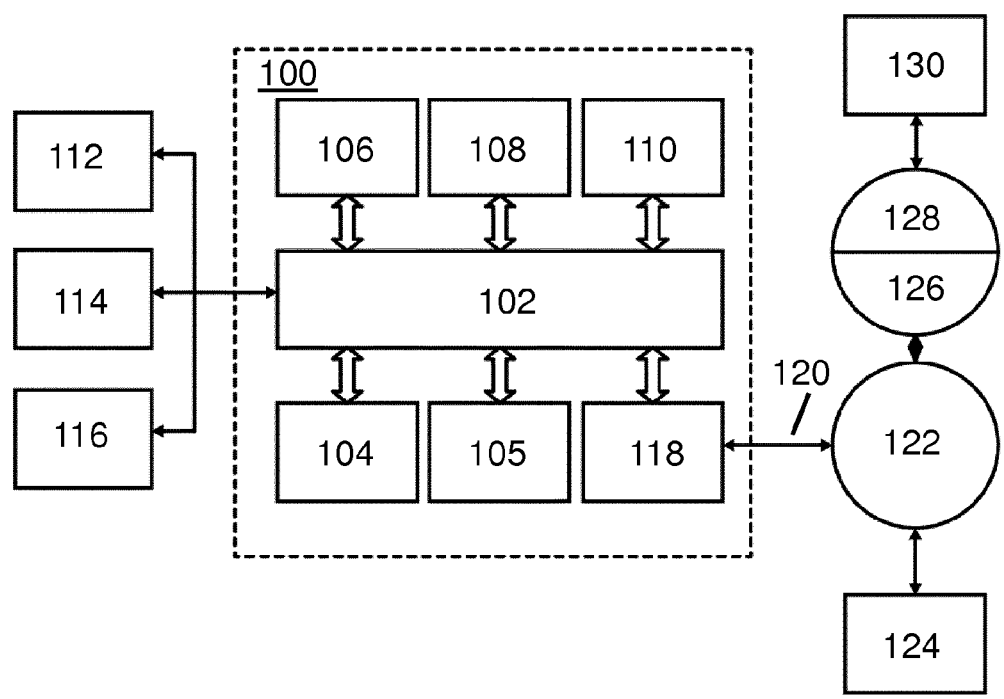
FIG. 6 is a block diagram of an example computer system, according to an embodiment.

FIG. 6 is a block diagram that illustrates a computer system 100 which can assist in implementing the methods, flows or the apparatus disclosed herein. Computer system 100 includes a bus 102 or other communication mechanism for communicating information, and a processor 104 (or multiple processors 104 and 105) coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or flat panel or touch panel display for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 may also include a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application may provide all or part of a method described herein, for example. The received code may be executed by processor 104 as it is received, and/or stored in storage device 110, or other non-volatile storage for later execution. In this manner, computer system 100 may obtain application code in the form of a carrier wave.

Figure 7:
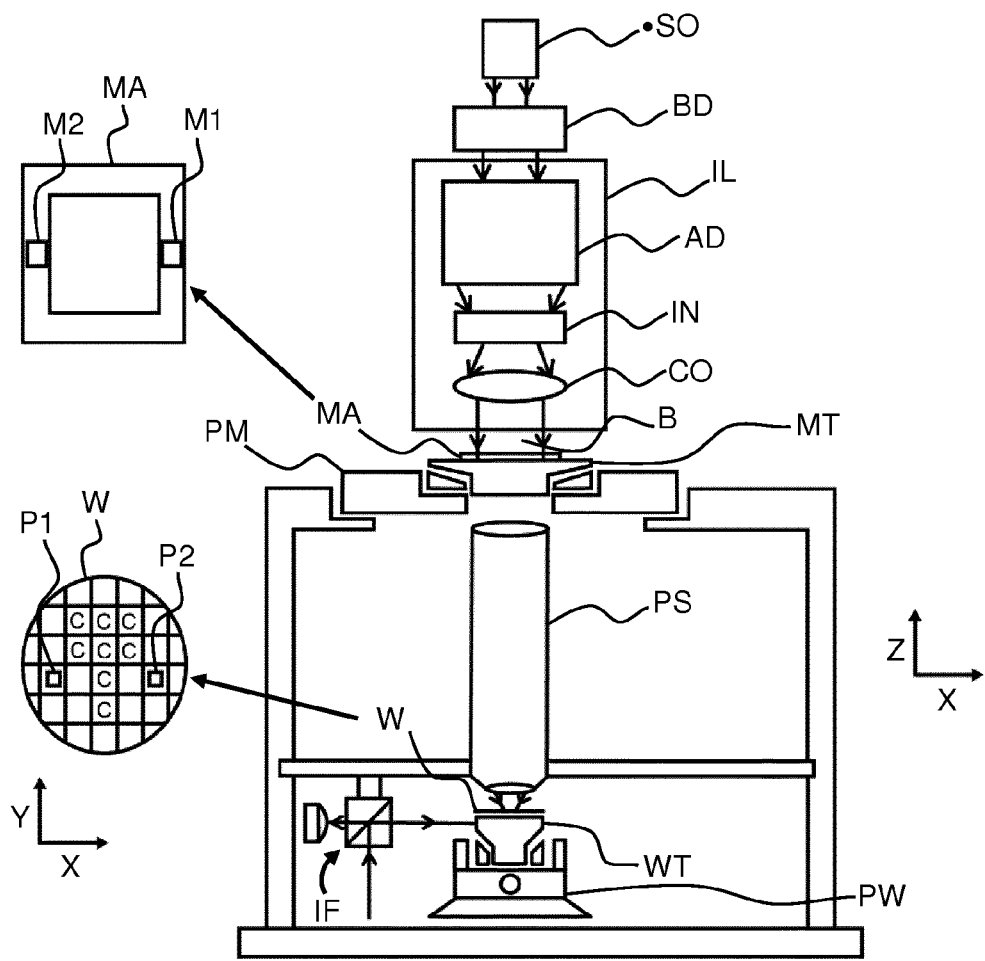
FIG. 7 is a schematic diagram of a lithographic projection apparatus, according to an embodiment.

FIG. 7 schematically depicts an exemplary lithographic projection apparatus in conjunction with the techniques described herein can be utilized. The apparatus comprises:
- an illumination system IL, to condition a beam B of radiation. In this particular case, the illumination system also comprises a radiation source SO;
- a first object table (e.g., patterning device table) MT provided with a patterning device holder to hold a patterning device MA (e.g., a reticle), and connected to a first positioner to accurately position the patterning device with respect to item PS;
- a second object table (substrate table) WT provided with a substrate holder to hold a substrate W (e.g., a resist-coated silicon wafer), and connected to a second positioner to accurately position the substrate with respect to item PS;
- a projection system ("lens") PS (e.g., a refractive, catoptric or catadioptric optical system) to image an irradiated portion of the patterning device MA onto a target portion C (e.g., comprising one or more dies) of the substrate W.

As depicted herein, the apparatus is of a transmissive type (i.e., has a transmissive patterning device). However, in general, it may also be of a reflective type, for example (with a reflective patterning device). The apparatus may employ a different kind of patterning device to classic mask; examples include a programmable mirror array or LCD matrix.

The source SO (e.g., a mercury lamp or excimer laser, LPP (laser produced plasma) EUV source) produces a beam of radiation. This beam is fed into an illumination system (illuminator) IL, either directly or after having traversed conditioning means, such as a beam expander Ex, for example. The illuminator IL may comprise adjusting means AD for setting the outer and/or inner radial extent (commonly referred to as σ-outer and σ-inner, respectively) of the intensity distribution in the beam. In addition, it will generally comprise various other components, such as an integrator IN and a condenser CO. In this way, the beam B impinging on the patterning device MA has a desired uniformity and intensity distribution in its cross-section.

It should be noted with regard to FIG. 7 that the source SO may be within the housing of the lithographic projection apparatus (as is often the case when the source SO is a mercury lamp, for example), but that it may also be remote from the lithographic projection apparatus, the radiation beam that it produces being led into the apparatus (e.g., with the aid of suitable directing mirrors); this latter scenario is often the case when the source SO is an excimer laser (e.g., based on KrF, ArF or $F_2$ lasing).

The beam PB subsequently intercepts the patterning device MA, which is held on a patterning device table MT. Having traversed the patterning device MA, the beam B passes through the lens PL, which focuses the beam B onto a target portion C of the substrate W. With the aid of the second positioning means (and interferometric measuring means IF), the substrate table WT can be moved accurately, e.g. so as to position different target portions C in the path of the beam PB. Similarly, the first positioning means can be used to accurately position the patterning device MA with respect to the path of the beam B, e.g., after mechanical retrieval of the patterning device MA from a patterning device library, or during a scan. In general, movement of the object tables MT, WT will be realized with the aid of a long-stroke module (coarse positioning) and a short-stroke module (fine positioning), which are not explicitly depicted in FIG. 7. However, in the case of a stepper (as opposed to a step-and-scan tool) the patterning device table MT may just be connected to a short stroke actuator, or may be fixed.

The depicted tool can be used in two different modes:
- In step mode, the patterning device table MT is kept essentially stationary, and an entire patterning device image is projected in one go (i.e., a single "flash") onto a target portion C. The substrate table WT is then shifted in the x and/or y directions so that a different target portion C can be irradiated by the beam PB;
- In scan mode, essentially the same scenario applies, except that a given target portion C is not exposed in a single "flash". Instead, the patterning device table MT is movable in a given direction (the so-called "scan direction", e.g., the y direction) with a speed v, so that the projection beam B is caused to scan over a patterning device image; concurrently, the substrate table WT is simultaneously moved in the same or opposite direction at a speed V=Mv, in which M is the magnification of the lens PL (typically, M=¼ or ⅕). In this manner, a relatively large target portion C can be exposed, without having to compromise on resolution.

Figure 8:
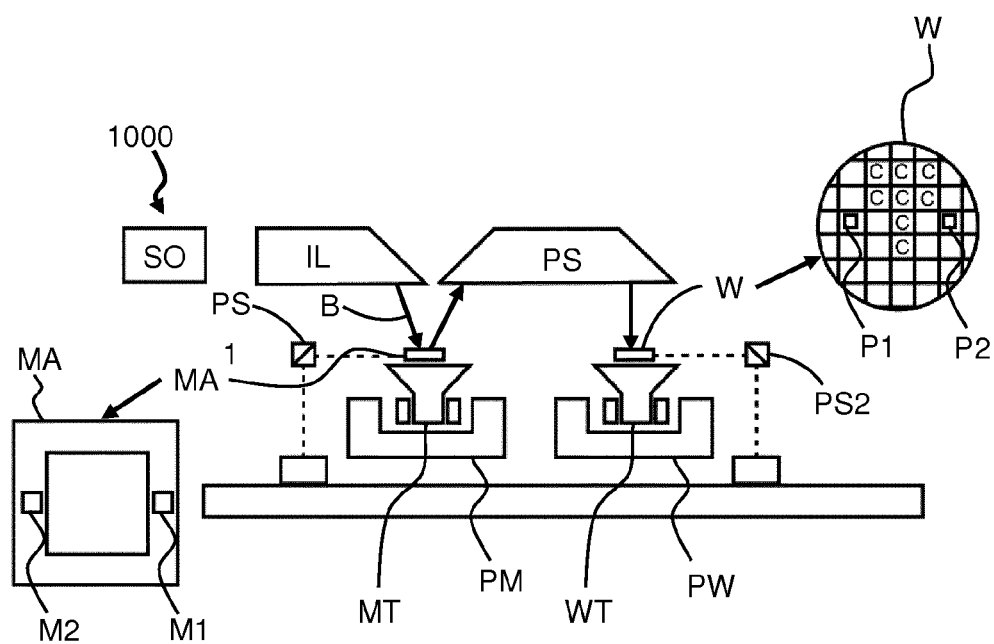
FIG. 8 is a schematic diagram of another lithographic projection apparatus, according to an embodiment.

FIG. 8 schematically depicts another exemplary lithographic projection apparatus 1000 in conjunction with the techniques described herein can be utilized.

The lithographic projection apparatus 1000 comprises:
- a source collector module SO
- an illumination system (illuminator) IL configured to condition a radiation beam B (e.g. EUV radiation).
- a support structure (e.g. a patterning device table) MT constructed to support a patterning device (e.g. a mask or a reticle) MA and connected to a first positioner PM configured to accurately position the patterning device;
- a substrate table (e.g. a wafer table) WT constructed to hold a substrate (e.g. a resist coated wafer) W and connected to a second positioner PW configured to accurately position the substrate; and
- a projection system (e.g. a reflective projection system) PS configured to project a pattern imparted to the radiation beam B by patterning device MA onto a target portion C (e.g. comprising one or more dies) of the substrate W.

As here depicted, the apparatus 1000 is of a reflective type (e.g. employing a reflective patterning device). It is to be noted that because most materials are absorptive within the EUV wavelength range, the patterning device may have multilayer reflectors comprising, for example, a multi-stack of Molybdenum and Silicon. In one example, the multi-stack reflector has a 40 layer pairs of Molybdenum and Silicon where the thickness of each layer is a quarter wavelength. Even smaller wavelengths may be produced with X-ray lithography. Since most material is absorptive at EUV and x-ray wavelengths, a thin piece of patterned absorbing material on the patterning device topography (e.g., a TaN absorber on top of the multi-layer reflector) defines where features would print (positive resist) or not print (negative resist).

Referring to FIG. 8, the illuminator IL receives an extreme ultra violet radiation beam from the source collector module SO. Methods to produce EUV radiation include, but are not necessarily limited to, converting a material into a plasma state that has at least one element, e.g., xenon, lithium or tin, with one or more emission lines in the EUV range. In one such method, often termed laser produced plasma ("LPP") the plasma can be produced by irradiating a fuel, such as a droplet, stream or cluster of material having the line-emitting element, with a laser beam. The source collector module SO may be part of an EUV radiation system including a laser, not shown in FIG. 8, for providing the laser beam exciting the fuel. The resulting plasma emits output radiation, e.g., EUV radiation, which is collected using a radiation collector, disposed in the source collector module. The laser and the source collector module may be separate entities, for example when a CO2 laser is used to provide the laser beam for fuel excitation.

In such cases, the laser is not considered to form part of the lithographic apparatus and the radiation beam is passed from the laser to the source collector module with the aid of a beam delivery system comprising, for example, suitable directing mirrors and/or a beam expander. In other cases the source may be an integral part of the source collector module, for example when the source is a discharge produced plasma EUV generator, often termed as a DPP source.

The illuminator IL may comprise an adjuster for adjusting the angular intensity distribution of the radiation beam. Generally, at least the outer and/or inner radial extent (commonly referred to as σ-outer and σ-inner, respectively) of the intensity distribution in a pupil plane of the illuminator can be adjusted. In addition, the illuminator IL may comprise various other components, such as facetted field and pupil mirror devices. The illuminator may be used to condition the radiation beam, to have a desired uniformity and intensity distribution in its cross section.

The radiation beam B is incident on the patterning device (e.g., mask) MA, which is held on the support structure (e.g., patterning device table) MT, and is patterned by the patterning device. After being reflected from the patterning device (e.g. mask) MA, the radiation beam B passes through the projection system PS, which focuses the beam onto a target portion C of the substrate W. With the aid of the second positioner PW and position sensor PS2 (e.g. an interferometric device, linear encoder or capacitive sensor), the substrate table WT can be moved accurately, e.g. so as to position different target portions C in the path of the radiation beam B. Similarly, the first positioner PM and another position sensor PS1 can be used to accurately position the patterning device (e.g. mask) MA with respect to the path of the radiation beam B. Patterning device (e.g. mask) MA and substrate W may be aligned using patterning device alignment marks M1, M2 and substrate alignment marks P1, P2.

The depicted apparatus 1000 could be used in at least one of the following modes:

1. In step mode, the support structure (e.g. patterning device table) MT and the substrate table WT are kept essentially stationary, while an entire pattern imparted to the radiation beam is projected onto a target portion C at one time (i.e. a single static exposure). The substrate table WT is then shifted in the X and/or Y direction so that a different target portion C can be exposed.

2. In scan mode, the support structure (e.g. patterning device table) MT and the substrate table WT are scanned synchronously while a pattern imparted to the radiation beam is projected onto a target portion C (i.e. a single dynamic exposure). The velocity and direction of the substrate table WT relative to the support structure (e.g. patterning device table) MT may be determined by the (de-)magnification and image reversal characteristics of the projection system PS.

3. In another mode, the support structure (e.g. patterning device table) MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Figure 9:
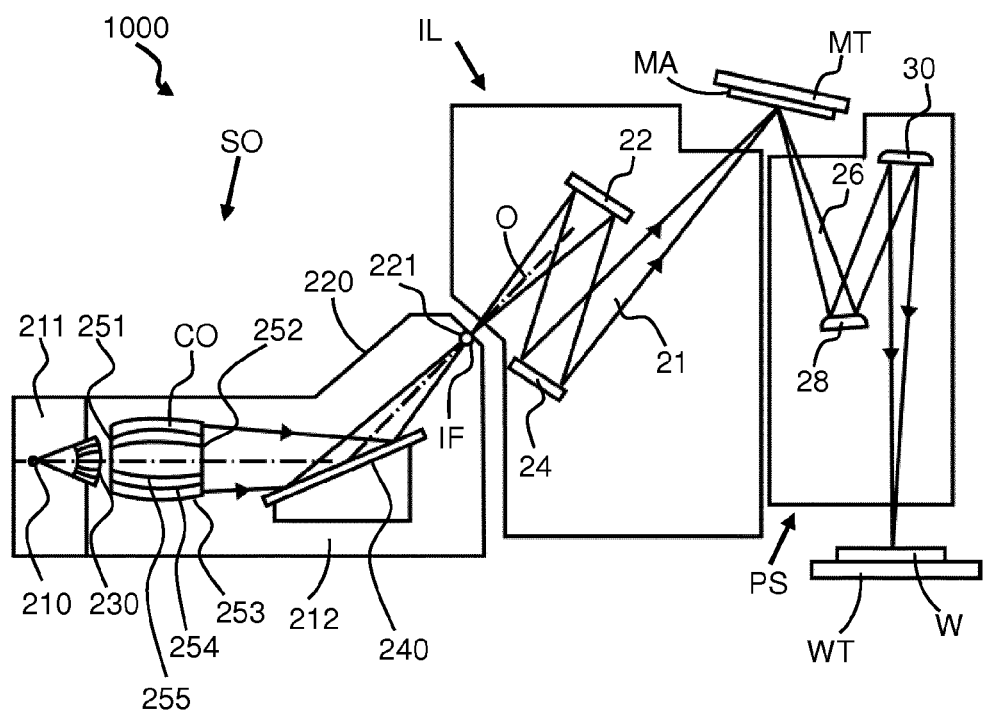
FIG. 9 is a more detailed view of the apparatus in FIG. 7, according to an embodiment.

FIG. 9 shows the apparatus 1000 in more detail, including the source collector module SO, the illumination system IL, and the projection system PS. The source collector module SO is constructed and arranged such that a vacuum environment can be maintained in an enclosing structure 220 of the source collector module SO. An EUV radiation emitting plasma 210 may be formed by a discharge produced plasma source. EUV radiation may be produced by a gas or vapor, for example Xe gas, Li vapor or Sn vapor in which the very hot plasma 210 is created to emit radiation in the EUV range of the electromagnetic spectrum. The very hot plasma 210 is created by, for example, an electrical discharge causing at least partially ionized plasma. Partial pressures of, for example, 10 Pa of Xe, Li, Sn vapor or any other suitable gas or vapor may be required for efficient generation of the radiation. In an embodiment, a plasma of excited tin (Sn) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap) which is positioned in or behind an opening in source chamber 211. The contaminant trap 230 may include a channel structure. Contamination trap 230 may also include a gas barrier or a combination of a gas barrier and a channel structure. The contaminant trap or contaminant barrier 230 further indicated herein at least includes a channel structure, as known in the art.

The collector chamber 211 may include a radiation collector CO which may be a so-called grazing incidence collector. Radiation collector CO has an upstream radiation collector side 251 and a downstream radiation collector side 252. Radiation that traverses collector CO can be reflected off a grating spectral filter 240 to be focused in a virtual source point IF along the optical axis indicated by the dot-dashed line 'O'. The virtual source point IF is commonly referred to as the intermediate focus, and the source collector module is arranged such that the intermediate focus IF is located at or near an opening 221 in the enclosing structure 220. The virtual source point IF is an image of the radiation emitting plasma 210.

Subsequently the radiation traverses the illumination system IL, which may include a facetted field mirror device 22 and a facetted pupil mirror device 24 arranged to provide a desired angular distribution of the radiation beam 21, at the patterning device MA, as well as a desired uniformity of radiation intensity at the patterning device MA. Upon reflection of the beam of radiation 21 at the patterning device MA, held by the support structure MT, a patterned beam 26 is formed and the patterned beam 26 is imaged by the projection system PS via reflective elements 28, 30 onto a substrate W held by the substrate table WT.

More elements than shown may generally be present in illumination optics unit IL and projection system PS. The grating spectral filter 240 may optionally be present, depending upon the type of lithographic apparatus. Further, there may be more mirrors present than those shown in the figures, for example there may be 1-6 additional reflective elements present in the projection system PS than shown in FIG. 9.

Collector optic CO, as illustrated in FIG. 9, is depicted as a nested collector with grazing incidence reflectors 253, 254 and 255, just as an example of a collector (or collector mirror). The grazing incidence reflectors 253, 254 and 255 are disposed axially symmetric around the optical axis O and a collector optic CO of this type may be used in combination with a discharge produced plasma source, often called a DPP source.

Figure 10:
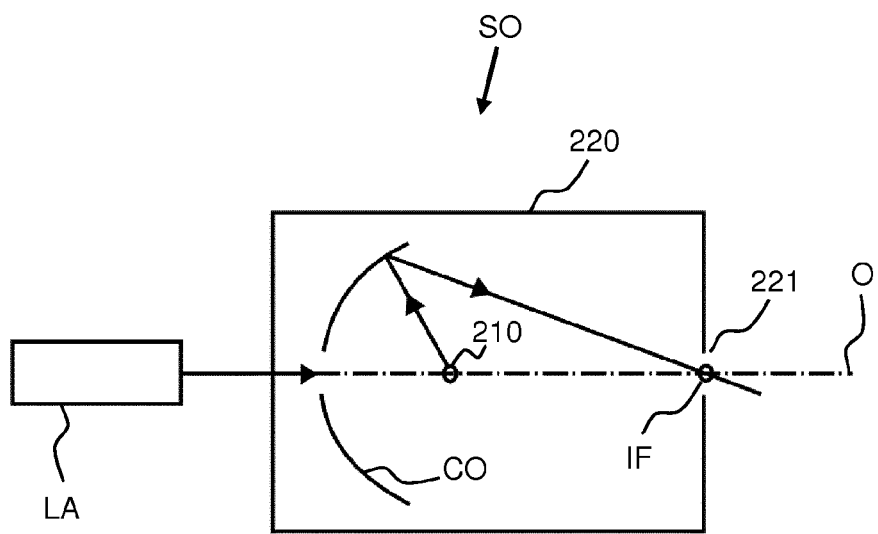
FIG. 10 is a more detailed view of the source collector module SO of the apparatus of FIG. 8 and FIG. 9, according to an embodiment.

Alternatively, the source collector module SO may be part of an LPP radiation system as shown in FIG. 10. A laser LA is arranged to deposit laser energy into a fuel, such as xenon (Xe), tin (Sn) or lithium (Li), creating the highly ionized plasma 210 with electron temperatures of several 10's of eV. The energetic radiation generated during de-excitation and recombination of these ions is emitted from the plasma, collected by a near normal incidence collector optic CO and focused onto the opening 221 in the enclosing structure 220.

The embodiments may further be described using the following clauses:

1. A method to determine a mask pattern for a patterning device, the method comprising:
   obtaining (i) a target pattern to be printed on a substrate subjected to a patterning process, (ii) an initial continuous tone image of the patterning device corresponding to the target pattern, (iii) a binarization function configured to transform the initial continuous tone image, and (iv) a process model configured to predict a pattern on the substrate from an output of the binarization function; and
   generating, by a hardware computer system, a binarized image having a mask pattern corresponding to the initial continuous tone image by iteratively updating the initial continuous tone image based on a cost function such that the cost function is reduced, wherein the cost function determines a difference between a predicted pattern determined by the process model and the target pattern.
2. The method of clause 1, wherein the binarization function is a sigmoid function, an arctan function, and/or a step function.
3. The method of any of clauses 1-2, wherein the mask pattern is a curvilinear pattern and/or a Manhattan pattern.
4. The method of any of clauses 1-3, wherein each iteration of determining the curvilinear pattern comprises:
   generating a transformed image by applying a binarization function to the initial continuous tone image;
   predicting, via simulation of the process model, a pattern from the transformed image;
   determining whether the cost function is reduced;
   in response to the cost function not reduced, determining a gradient of the cost function; and
   values of mask variables corresponding to the initial continuous tone image and/or parameters of the binarization function based on the gradient of the cost function such that the cost function is reduced.
5. The method of clause 4, wherein the determining the gradient of the cost function involves computing a complete gradient over mask variables for the binarization function including at least one of the sigmoid function, the arctan function, and the step function.
6. The method of any of clauses 4-5, modifying values of the mask variables and/or the parameters of the binarization function comprises:
   applying an optimization process to the gradient of the cost function;
   identifying values of the mask variables and/or the parameters that result in a minimum gradient value; and
   assigning the identified values to the mask variables.
7. The method of clause 6, wherein the mask variables are intensity values of pixels within the initial continuous tone image.
8. The method of clause 6, wherein the parameters of the binarization function comprise a steepness and threshold.
9. The method of any of clauses 1-8, wherein the cost function is minimized
10. The method of any of clauses 1-9, wherein the cost function is an edge placement error and/or a mask rule check violation probability.
11. The method of any of clauses 1-10, wherein the initial continuous tone image is a continuous transmission mask image comprising features corresponding to the target pattern and sub-resolution assist features.
12. The method of any of clauses 1-11, further comprising:
    manufacturing a patterning device including structural features corresponding to the binarized image.
13. The method of clause 12, further comprising:
    performing, by a lithographic apparatus, a patterning step using a patterning device having the binarized pattern to print a corresponding pattern on the substrate.
14. The method any of clauses 12-13, wherein the structural features correspond to optical proximity corrections including assist features and/or contour modification.
15. A computer program product comprising a non-transitory computer readable medium having instructions recorded thereon, the instructions when executed by a computer implementing the method of any of the above clauses.

The concepts disclosed herein may simulate or mathematically model any generic imaging system for imaging sub wavelength features, and may be especially useful with emerging imaging technologies capable of producing increasingly shorter wavelengths. Emerging technologies already in use include EUV (extreme ultra violet), DUV lithography that is capable of producing a 193 nm wavelength with the use of an ArF laser, and even a 157 nm wavelength with the use of a Fluorine laser. Moreover, EUV lithography is capable of producing wavelengths within a range of 20-5 nm by using a synchrotron or by hitting a material (either solid or a plasma) with high energy electrons in order to produce photons within this range.

While the concepts disclosed herein may be used for imaging on a substrate such as a silicon wafer, it shall be understood that the disclosed concepts may be used with any type of lithographic imaging systems, e.g., those used for imaging on substrates other than silicon wafers.

The descriptions above are intended to be illustrative, not limiting. Thus, it will be apparent to one skilled in the art that modifications may be made as described without departing from the scope of the claims set out below.

What is claimed is:

1. A method comprising:
obtaining (i) a target pattern to be printed on a substrate subjected to a patterning process, (ii) an initial continuous tone image corresponding to the target pattern, (iii) a binarization function configured to transform the initial continuous tone image, and (iv) a process model configured to predict a pattern on the substrate from an output of the binarization function; and
generating, by a hardware computer system, a binarized image having a mask pattern for a patterning device and corresponding to the initial continuous tone image by iteratively updating the initial continuous tone image based on a cost function such that the cost function is reduced,
wherein the cost function determines a difference between a predicted pattern determined by the process model and the target pattern.

2. The method of claim 1, wherein the binarization function is a sigmoid function, an arctan function, and/or a step function.

3. The method of claim 1, wherein the mask pattern is a curvilinear pattern and/or a Manhattan pattern.

4. The method of claim 1, wherein an iteration of determining the curvilinear pattern comprises:
generating a transformed image by applying a binarization function to the initial continuous tone image;
predicting, via simulation of the process model, a pattern from the transformed image;
determining a gradient of the cost function; and
modifying a value of one or more mask variables corresponding to the initial continuous tone image and/or one or more parameters of the binarization function based on the gradient of the cost function such that the cost function is reduced.

5. The method of claim 4, wherein the determining the gradient of the cost function involves computing a complete gradient over mask variables for the binarization function.

6. The method of claim 4, wherein modifying a value of one or more mask variables and/or the one or more parameters of the binarization function comprises:
applying an optimization process to the gradient of the cost function; and
identifying a value of one or more the mask variables and/or one or more parameters of the binarization function that result in a minimum gradient value.

7. The method of claim 6, comprising modifying a value of one or more mask variables and wherein the one or more mask variables are intensity values of pixels within the initial continuous tone image.

8. The method of claim 6, comprising modifying one or more parameters of the binarization function and wherein the one or more parameters of the binarization function comprise a steepness and threshold.

9. The method of claim 1, wherein the cost function is minimized.

10. The method of claim 1, wherein the cost function is an edge placement error and/or a mask rule check violation probability.

11. The method of claim 1, wherein the initial continuous tone image is a continuous transmission mask image comprising features corresponding to the target pattern and sub-resolution assist features.

12. The method of claim 1, further comprising manufacturing a patterning device including structural features corresponding to the binarized image.

13. The method of claim 1, further comprising performing, by a lithographic apparatus, a patterning step using a patterning device having structural features corresponding to the binarized image to print a corresponding pattern on the substrate.

14. The method of claim 12, wherein the structural features correspond to optical proximity corrections including assist features and/or contour modification.

15. A computer program product comprising a non-transitory computer readable medium having instructions therein, the instructions, when executed by a computer, configured to cause the computer to at least:
obtain (i) a target pattern to be printed on a substrate subjected to a patterning process, (ii) an initial continuous tone image corresponding to the target pattern, (iii) a binarization function configured to transform the initial continuous tone image, and (iv) a process model configured to predict a pattern on the substrate from an output of the binarization function; and
generate a binarized image having a mask pattern for a patterning device and corresponding to the initial continuous tone image by iterative updating of the initial continuous tone image based on a cost function such that the cost function is reduced,
wherein the cost function determines a difference between a predicted pattern determined by the process model and the target pattern.

16. The computer program product of claim 15, wherein the binarization function is a sigmoid function, an arctan function, and/or a step function.

17. The computer program product of claim 15, wherein an iteration of determination of the curvilinear pattern comprises:
generation of a transformed image by applying a binarization function to the initial continuous tone image;
prediction, via simulation of the process model, of a pattern from the transformed image;
determination of a gradient of the cost function; and
modification of a value of one or more mask variables corresponding to the initial continuous tone image and/or one or more parameters of the binarization function based on the gradient of the cost function such that the cost function is reduced.

18. The computer program product of claim 15, wherein the cost function is an edge placement error and/or a mask rule check violation probability.

19. The computer program product of claim 15, wherein the initial continuous tone image is a continuous transmission mask image comprising features corresponding to the target pattern and sub-resolution assist features.

20. The computer program product of claim 15, wherein the instructions are further configured to cause the computer to output information for manufacturing a patterning device including structural features corresponding to the binarized image.

* * * * *